(12) United States Patent
Dean et al.

(10) Patent No.: US 6,477,436 B1
(45) Date of Patent: Nov. 5, 2002

(54) SYSTEM AND METHOD FOR CREATION OF A NETWORK COMPUTING ENVIRONMENT

(75) Inventors: Jeffrey Randell Dean, Austin, TX (US); Ingrid Milagros Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,559

(22) Filed: Jul. 17, 1998

(51) Int. Cl.$^7$ .............................................. G06F 19/00
(52) U.S. Cl. ............................ 700/95; 700/96; 700/99; 700/100; 700/104; 705/8; 705/9; 705/28; 705/29
(58) Field of Search .................. 700/95, 96, 99, 700/100, 104, 117; 705/8, 9, 28, 29; 709/220

(56) References Cited

U.S. PATENT DOCUMENTS

| | | | | |
|---|---|---|---|---|
| 5,327,340 A | * | 7/1994 | Kaneko et al. | 700/95 |
| 5,575,660 A | * | 11/1996 | Hooks | 434/374 |
| 5,801,946 A | * | 9/1998 | Nissen et al. | 700/95 |
| 5,894,571 A | * | 4/1999 | O'Connor | 713/2 |
| 6,236,901 B1 | * | 5/2001 | Goss | 700/95 |
| 6,240,328 B1 | * | 5/2001 | LaLonde et al. | 700/95 |

OTHER PUBLICATIONS

Hewlett Packard, instruction for assembling PC, pp. 1–18, 1997.*
Power SPEC PC, instruction for quick set up, pp. 1–5.*

* cited by examiner

*Primary Examiner*—Ramesh Patel
(74) *Attorney, Agent, or Firm*—Leslie A. Van Leeuwen; Bracewell & Patterson L.L.P.

(57) ABSTRACT

A system and method for organizing the computer network components, including hardware, software, peripherals and services (i.e. internet and online backup). This, in order to make the creation of a computer network environment more user friendly, highly organized and easy to follow. The present invention is specifically targeted at the small business owner, in order to enable them to efficiently establish their own network system. This system will enable them to run their businesses more productively, with greater ease and less down time. This is accomplished through the use of an effective kit or packaging system containing all the required network components.

21 Claims, 13 Drawing Sheets

SYSTEM AND METHOD FOR CREATION OF A NETWORK COMPUTING ENVIRONMENT

CROSS-REFERENCE TO RELATED APPLICATIONS

The present patent application is related to Ser. No. 09/118,210, now U.S. Pat No. 6,209,031, entitled "CONFIGURING COMPUTER NETWORK OPERATION BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS" which is hereby incorporated by reference herein.

In addition, the following applications are also related to the present invention:

The present patent application is related to Ser. No. 09/118,209, now abandoned, entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES".

The present patent application is related to Ser. No. 09/118,211, now U.S. Pat. No. 6,199,108, entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK".

The present patent application is related to Ser. No. 09/118,559, now abandoned, entitled "SYSTEM AND METHOD FOR CREATION OF A NETWORK COMPUTING ENVIRONMENT".

The present patent application is related to Ser. No. 09/118,208, now U.S. Pat. No. 6,243,745, entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS".

The present patent application is related to Ser. No. 09/118,557, now U.S. Pat No. 6,182,131, entitled "DATA PROCESSING SYSTEM, METHOD, AND PROGRAM PRODUCT FOR AUTOMATING ACCOUNT CREATION IN A NETWORK".

The present patent application is related to Ser. No. 09/118,293, entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY".

The present patent application is related to Ser. No. 09/118,560, now U.S. Pat. No. 6,263,346, entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS".

The present patent application is related to Ser. No. 09/118,292, now U.S. Pat. No. 6,108,779, entitled "SERVER AND COMPUTER NETWORK THAT PERMIT A CLIENT TO BE EASILY INTRODUCED INTO THE COMPUTER NETWORK".

The present patent application is related to Ser. No. 09/118,207, entitled "METHOD AND APPARATUS FOR CREATING A PRELOAD IMAGE".

The present patent application is related to Ser. No. 09/118,558, now abandoned, entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES".

The present patent application is related to Ser. No. 09/118,555, entitled "AUTOMATIC CLEANUP OF USER DATA IN A NETWORK ENVIRONMENT".

The present patent application is related to Ser. No. 09/118,556, now U.S. Pat. No. 6,105,100, entitled "METHOD AND APPARATUS FOR DETECTING AND INITIALIZING THE ADDITION OF A NEW CLIENT MACHINE IN A NETWORK".

TECHNICAL FIELD

The present invention relates to a system and method for organizing the computer network components, including hardware, software, peripherals and services (i.e. Internet and online backup). This is in order to make the creation of a computer network environment more user friendly, highly organized and easy to follow. The present invention is specifically targeted at the small business owner, in order to enable them to efficiently establish their own network system. This system will enable them to run their businesses more productively, with greater ease and less down time. This is accomplished through the use of an effective kit or packaging system containing all the required network components.

BACKGROUND OF THE INVENTION

Computers and their application programs are used in all aspects of business, industry and academic endeavors. In recent years there has been a technological revolution driven by the convergence of the data processing industry with the consumer electronics industry. This advance has been even further accelerated by the extensive consumer and business involvement in the Internet in recent years. As a result of these changes, it seems as if virtually all aspects of human productivity in the industrialized world requires human and computer interaction. The computer industry has been a force for bringing about great increases in business and industrial productivity. Almost every week seems to bring computer industry advances which promise even further increases in productivity. These advances offer to drive down business and industry costs and increase efficiency, in addition to increasing productivity. In addition, the cost of "computer power" continues to drop as a result of rapid advances in computer related technologies.

Despite all of these advantages, there still remains great resistance in all industries and business fields to new computer systems and significant system upgrades which offer much in productivity increases. This resistance results from past experience which equates to installing new computer systems or significant upgrades in existing systems with large amounts of down time during which the business, manufacturing facility or individual worker functions are inoperative or operate at diminished levels. When a business or production facility is trying to decide whether to install a new or significantly upgraded computer system, the concern about down time, the possible loss of business, as well as stress on the workers involved very often outweighs the cost of the installation in influencing the decision. The concern about business and production delays resulting from installation has become so great that fewer and fewer of even small businesses are still trying to make system and program changes on their own. The professional computer service industry which carries out and supports installations and upgrades for the business and industrial sector has been rapidly expanding over the past decade. However, even with such computer professional support the threat of such down time coupled with the costs of such professional services caused by installation delays remains of great concern, especially to the small business establishments.

SUMMARY OF THE INVENTION

The complexity of setting up a network of machines is one key reason why small business owners either do not get their business running on computers or expand the number of computer systems used in running their business. Even in a network computing environment the hardware and software components needed to build the network require a thorough understanding of all components of the network in order to put everything together. One problem is packaging of the components needed to build the network. Too many packages are required to accomplish this task. These packages offer very little and, most of the time, no documentation is supplied on how to use these components, thus requiring the end user to be an expert in setting up networks.

It is an objective of the present invention to resolve the problem of making the setting up of a network in a less complex manner and be more user friendly. Specifically more friendly to the small business owner.

DETAILED DESCRIPTION OF THE PREFERRED EMBODIMENT

To resolve the problem of setting up of a network which is less complex and more user friendly to a user or small business owner, a packaging system was developed which is the basis of the present invention. The following represents the solution to this problem.

The invention consists of a "kit" or package system that virtually organizes the networking components (hardware, software and peripherals, and services such as Internet and online backup); makes the building of a network computing environmental almost "fool proof". This kit or package arrangement offers software components preloaded and configured in a form which is ready for the final end user setup. Thus, it makes the network establishment a turnkey solution. This turnkey set up provides a step-by-step color coded and labeled set of instructions, to plan, connect and do the final setup. It employs all of the components needed to build a turnkey network computing environment.

Since this, in many instances, involves interaction with "Resellers", it would be appropriate at this moment to define what is meant by a Reseller. A "Reseller" represents a third party that receives the prepackaged or "kit" from the manufacturer, such as International Business Machines Corporation ("IBM"). The Reseller is licensed by the software manufacturer to install specific software. Thus, the Reseller installs the software required for a specific end user for their particular network application needs. This might, for example, involve different software for a law firm or accounting firm, as opposed to that required by a network of stores involved with greeting cards.

Thus, the Reseller, upon receipt of a fully organized kit or package from the manufacturer, will supply the licensed software for a specific client user in a space or slot provided in the kit or package boxes and then the final kit or package is resealed, ready to be sold to specific end user. The total completed kit or package is then shipped to the specific client user or small business.

Let us now take a few moments to define some of the terms used. A "Turnkey System" can be defined as a finished system, complete with all the necessary hardware and documentation and with software installed and ready for use. It can further be considered as a computer system developed for a specific application, such as a point-of-sale terminal and delivered ready to run, with all the necessary application programs and peripherals. A "kit" can be defined as a source of software distribution that has been packaged in such a way that it can be unpackaged and installed according to a series of steps using standard tools and entirely documented by some reasonable chain of references from the top level README file.

In the present invention, the "kit" provides the following:
1. Instructions on what was received to build the network.
2. Instructions on how to plan for building the network.
3. Details on which of the packages are to be used first in the sequence of installation actions.
4. What items within each package will be used.
5. Instructions on how, what and where to place the extra parts not needed to build the network.

6. Information on how to use the system.
7. Where to place all items.
8. How to use color coded cables.
9. The steps to take in using each package that comprises the network environment.
10. Labels for the Reseller to use to mark the network components as documented in the kit for use and reference while using the kit.

The results of the use of this process are an easily built network computing environment completed in under a few hours and a well organized package that can be used in the future when the need again arises. There is no requirement to repackage any of the existing packages that are needed to build the network. This is particularly suited for the small business owner.

Figure 1:
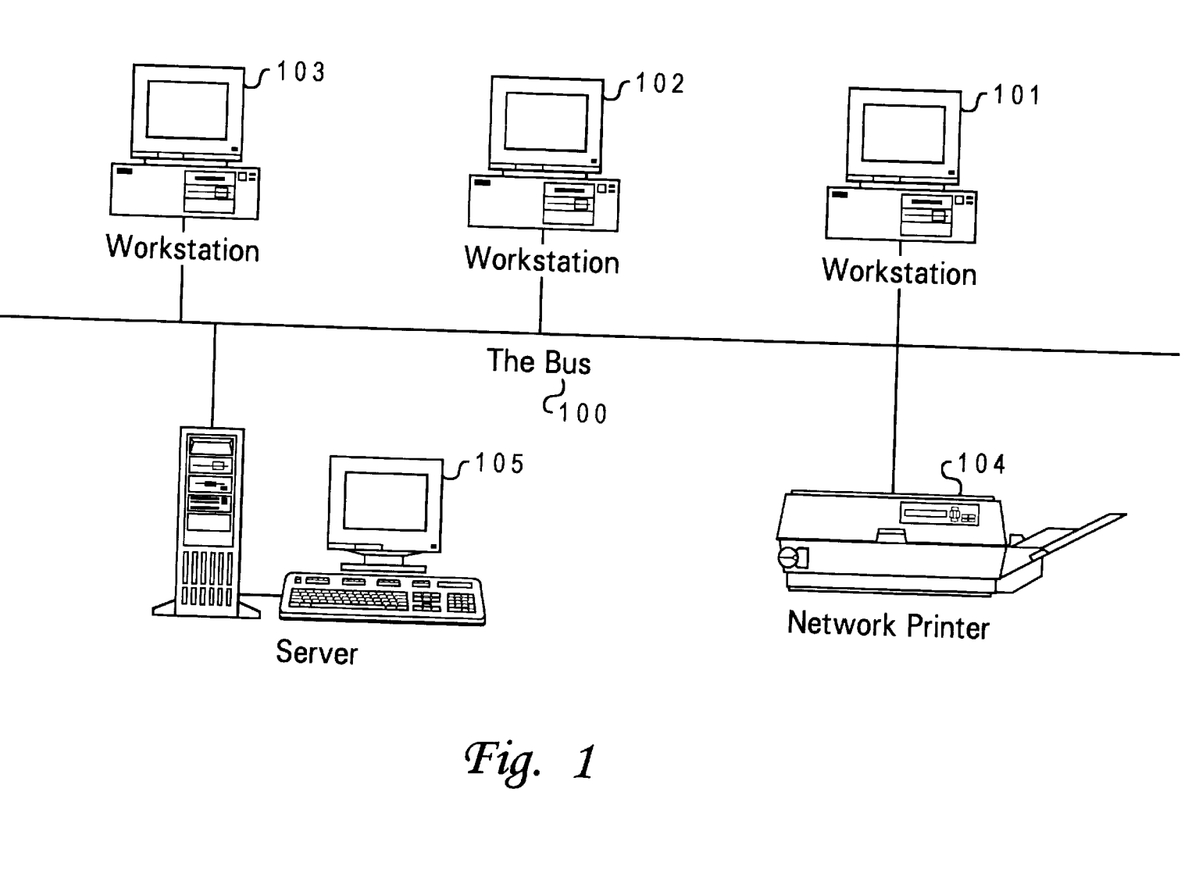
FIG. 1 represents the simplest network strung between computers and other network devices.
Figure 2:
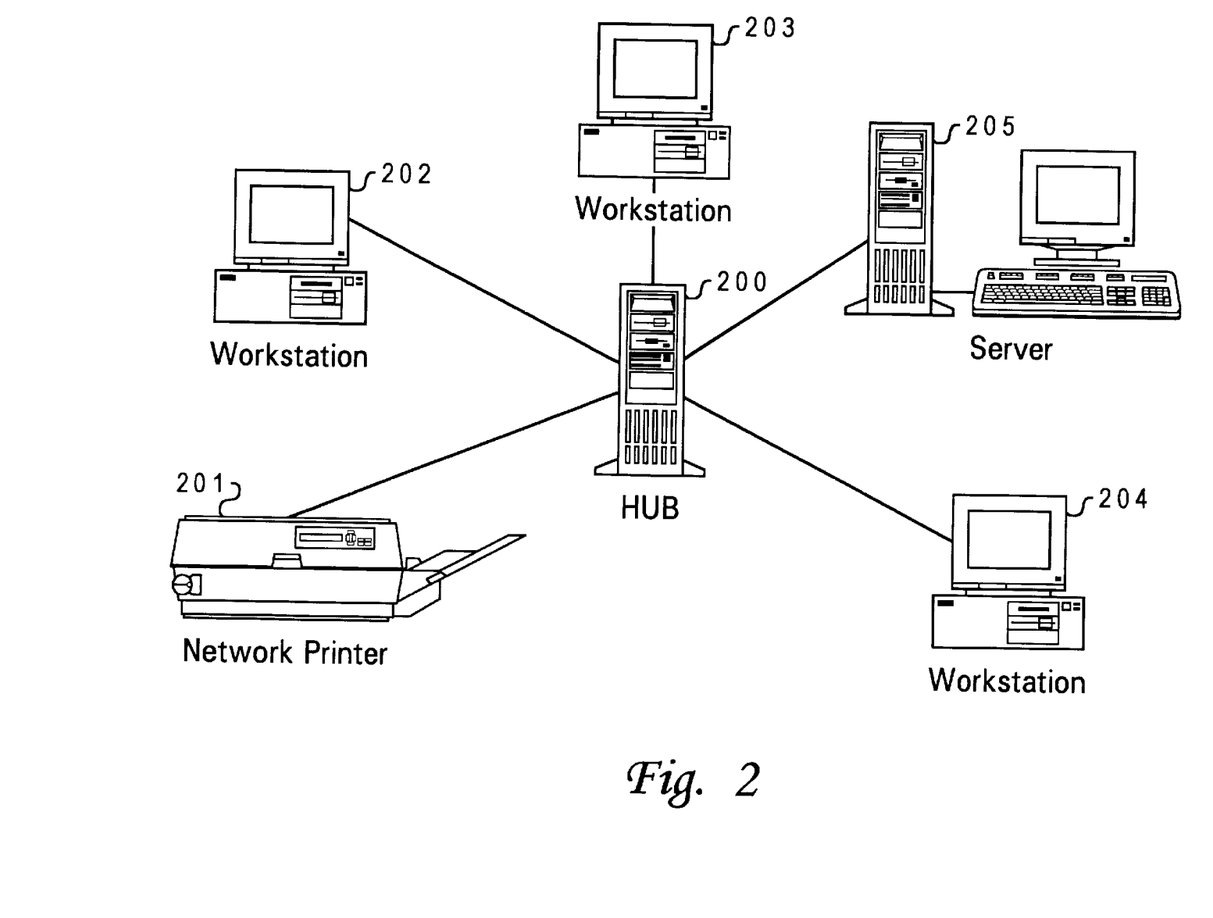
FIG. 2 represents a more complex, simple and commonly employed Star configuration LAN computer network. In this very basic arrangement, each device is connected to one central device called a router, star controller or HUB. The central device functions as a switching center since each machine cannot pass messages directly to another.
Figure 3:
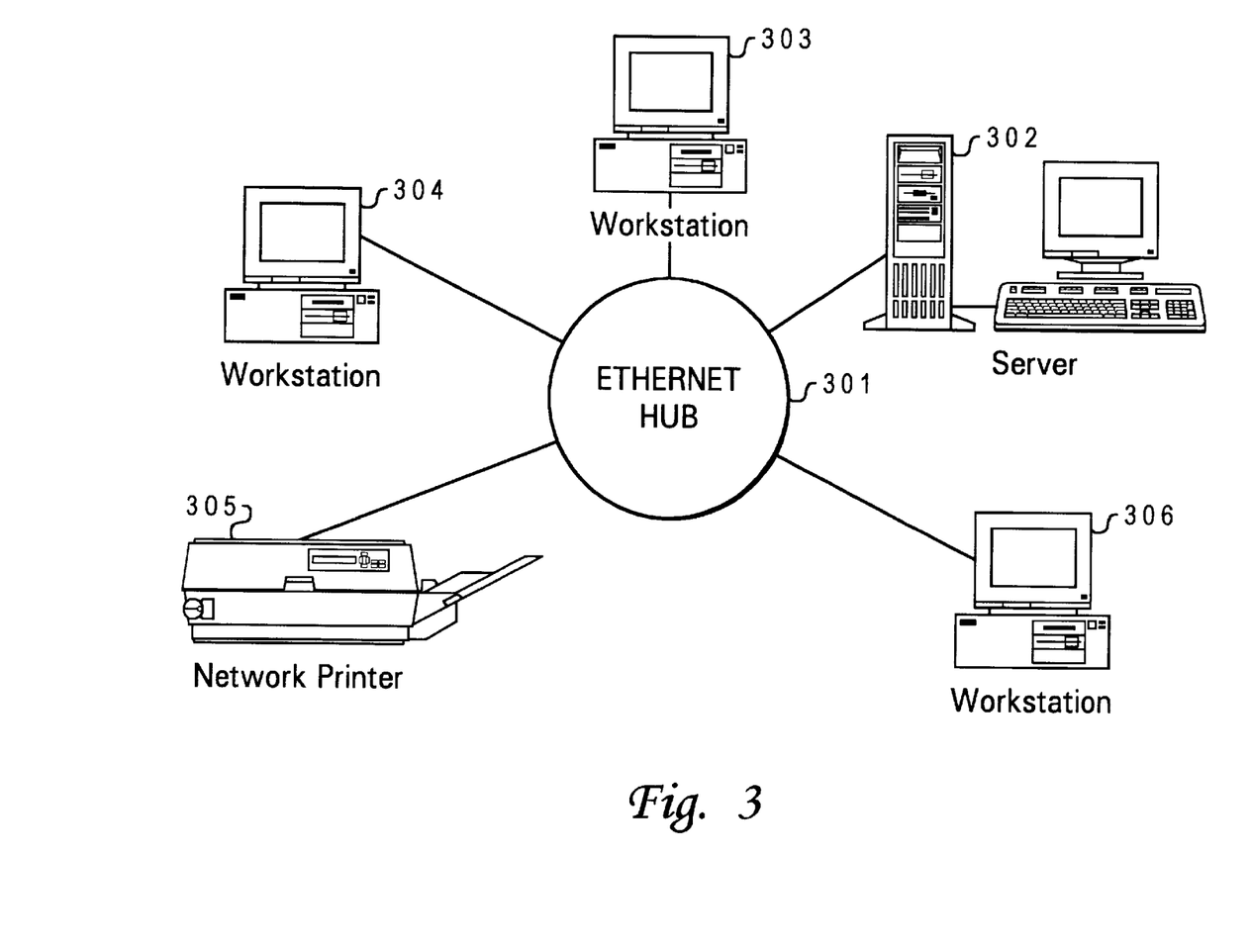
FIG. 3 represents the ring topology. In ring topology, which is used by Token Ring and FDDI, the wiring and physical arrangements are similar to the star network. However, instead of having a concentrator at the center of a ring network, there is a device called a Multi-station Access Unit (MAU). The MAU does the same thing a HUB does, but it works with Token Rings instead of Ethernet networks.

For purposes of network background and definitions, FIGS. 1, 2 and 3 are offered as a generalized view of commonly used networks.

FIG. 1 represents the simplest network made of wires strung between computers and other network devices. The wires connect to network interface cards or NICs installed in computers. The NICs handle the computer interactions with the rest of the network. These two items can create a simple network based on what is called a network bus topology or 10BASE2 bus. FIG. 1 shows a workstation at 101, 102 and 103. The bus is shown at 100 and the server at 105. The printer is seen at 104.

FIG. 2 represents a typical and commonly employed star configuration LAN. In this particular arrangement, each device is connected to one central device called a router or star controller at 200. The central device functions as a switching center since each machine cannot pass messages directly to another. The devices shown are printers 201, computers 203 and 204 and monitors 203 and a server at 205.

FIG. 3 represents the ring topology. In ring topology, which is used by Token Ring and FDDI, the wiring and physical arrangements are similar to, the star network. However, instead of having a concentrator at the center of a ring network, there is a device called a Ethernet HUB.

The workstations are shown at 303, 304 and 306. The Ethernet HUB is seen at 301, while the printer is seen at 305. The servers is located at 302.

Figure 4:
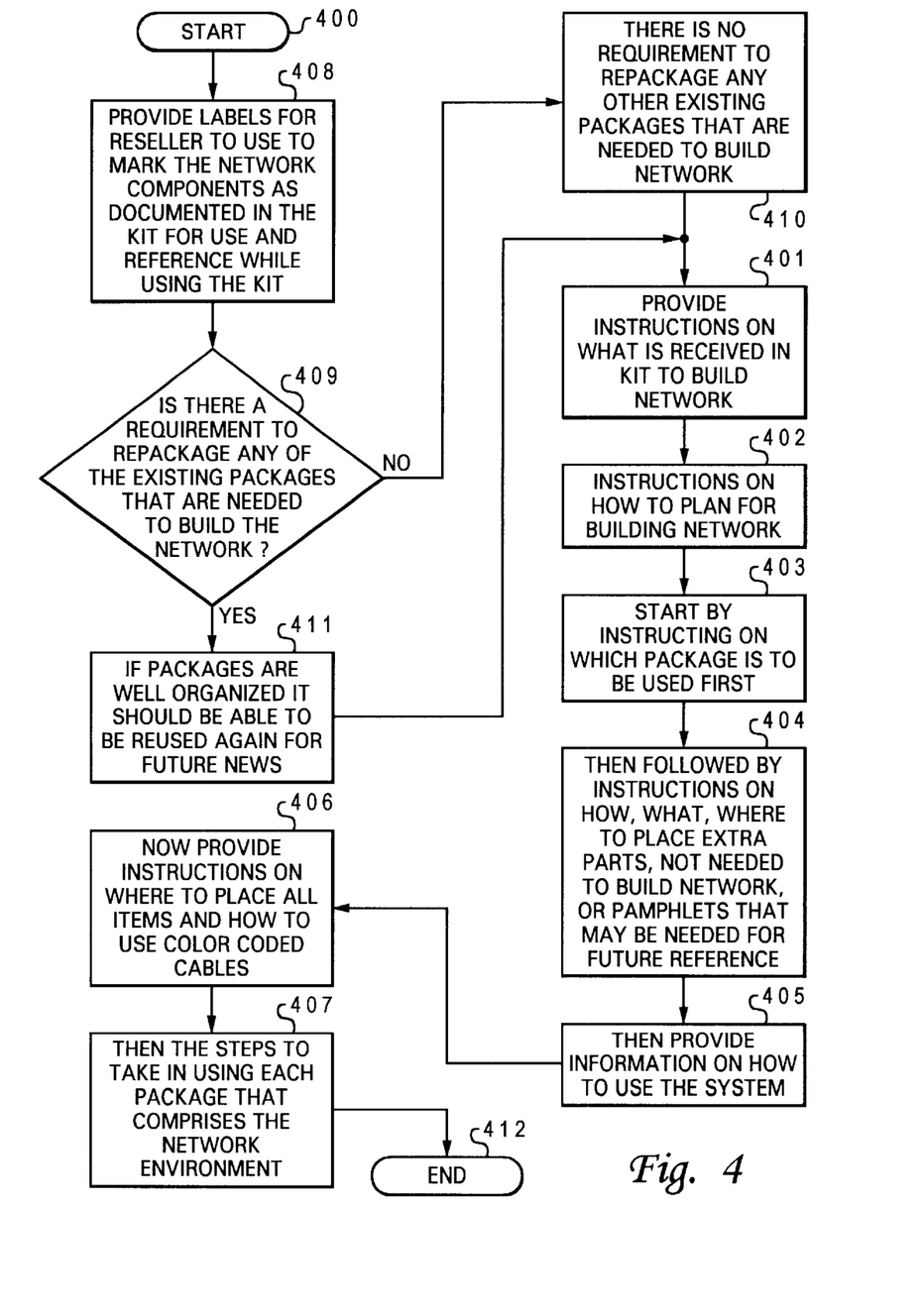
FIG. 4 is a flowchart representing the sequence of steps for implementation of the current invention. This invention represents a "kit" or package of components which offers the user, such as a small business owner, the opportunity to build an efficient network computing environment without confusion and at a minimum of effort and downtime. Here very specific instructions are given for the use and installation of each component package in the installation kit and the process literally "holds the user's hand" throughout the installation process.

Regarding the actual steps for the implementation of the present invention, this can be seen in FIG. 4. These represent the steps of the present invention, and are based on a "kit" or package that virtually organizes the networking components and makes the building of a network computing environmental almost fool proof. FIG. 4 describes the process of the preparation of the kit or package. Steps 408 through 411 represent the steps employed for the Reseller, prior to steps 401 through 412, which represent the steps provided for the end user or customer.

The initial step, 408, calls for providing labels for the Reseller to use to mark the network components as documented in the kit for use and referencing while using the kit. The question is then raised at 409 as to whether there is a requirement to repackage any of the existing packages that are needed to build the network at 409. The system at 410 indicates there is no such requirement and the process moves on to 401. If the packages are well organized, as is the case in the present invention, it should be able to be reused in the future at 411 and the process moves on to 401.

The next step is to provide the user or customer with instructions on what is received in the kit to build the network at 401. Next is to provide the user with instructions on how to plan for building the computer network at 402.

The following step involves instructing the user on the sequence of which package is to be first employed at 403. The user is subsequently informed as to how, what and where to place extra parts, not needed to build the current network at 404. The next step, 405, is to instruct the user as to how to use the system. Instructions at 406 are then provided as to where to place all items and how to use the color coded cables. Then the user is provided, 407, with instructions regarding the steps to take in using each package that comprises the network environment. The package or kit is now completed.

Figure 5:
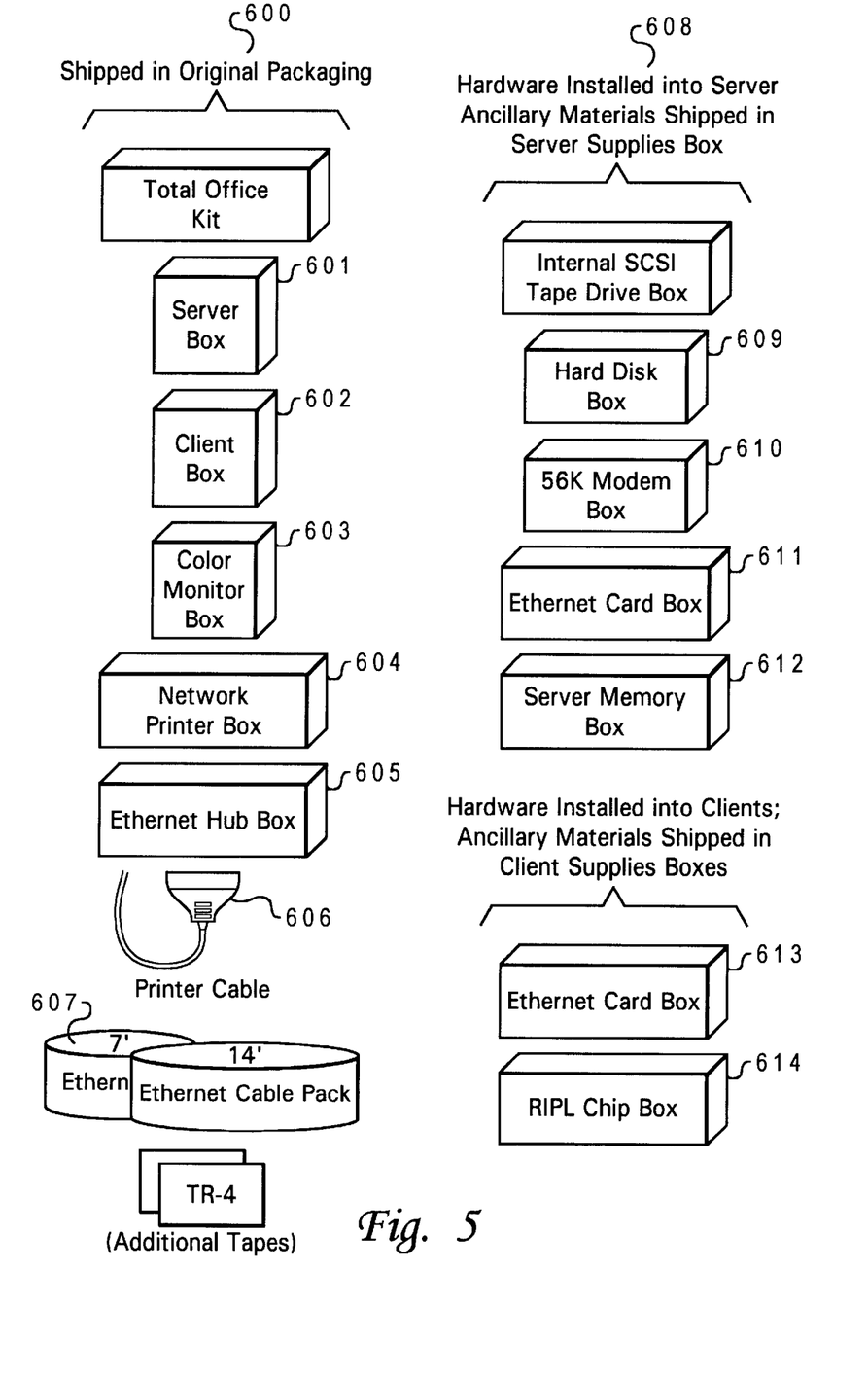
FIG. 5 represents the contents of a typical preassembled "kit" for allowing the customer to readily set up a network system.

FIG. 5 represents the entire contents of a typical preassembled "kit" for allowing the customer to readily set up a network system. This includes in the kit a Server Box, 601, a Client Box, 602, a Color Monitor Box, 604, a Network Box, 604, an Ethernet Hub Box, 605, a Printer Cable, 606, and Ethernet Cable Pack, 607. Regarding hardware installed in the Server Ancillary Materials shipped in Server Supply Box, 608, this would include an Internal SCSI Tape Drive Box, 608, a Hard Disk Box, 609, 56K Modem Box, 610, Ethernet Card Box, 611, and Server Memory Box, 612. The hardware installed into Clients Ancillary Materials Shipped in Client supply boxes include Ethernet Card Box, 613, and RIPL Chip Box, 614.

Figure 6:
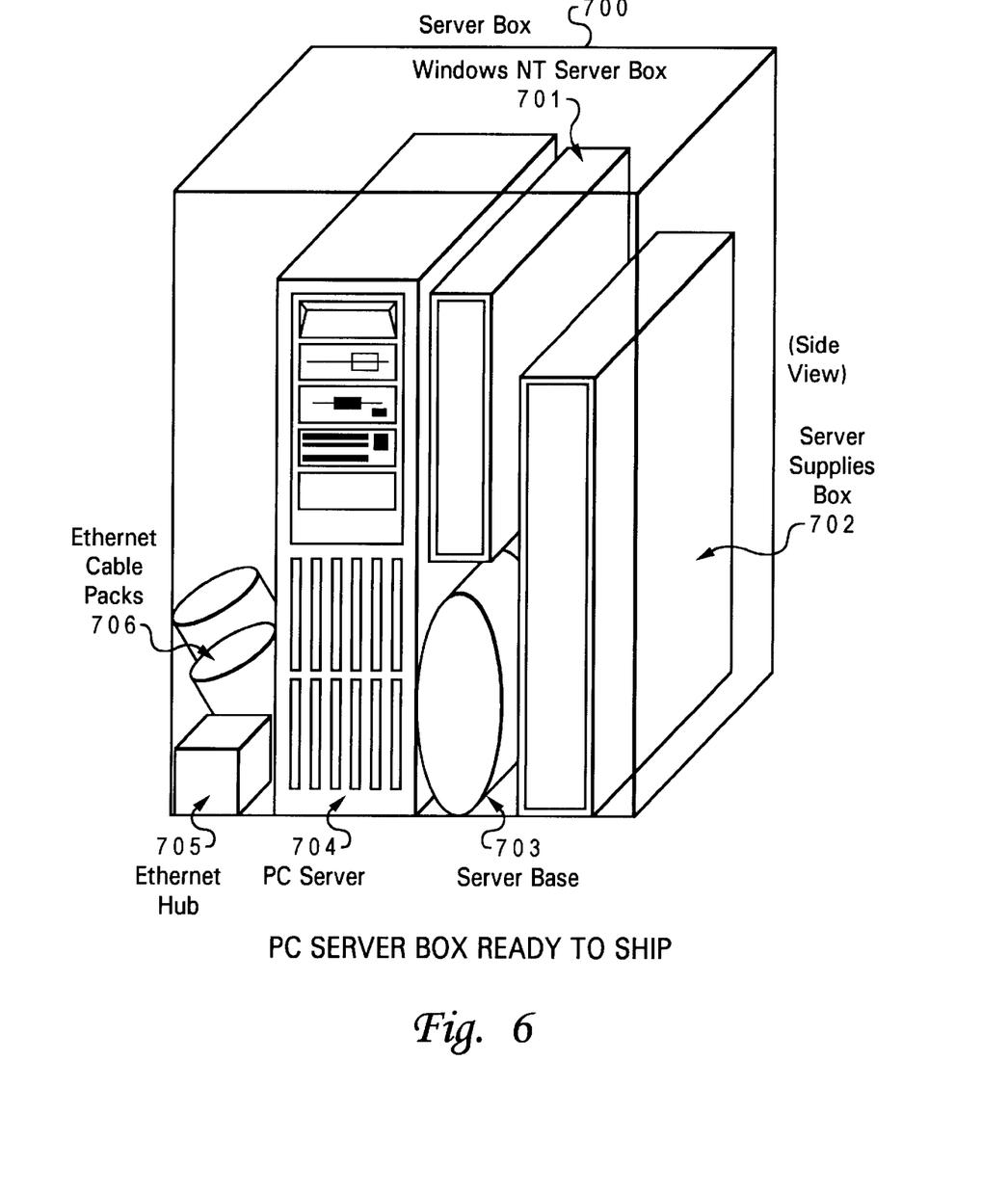
FIG. 6 represents the contents of the packaged Server Box showing the various components being shipped.

FIG. 6 represents the contents of the packaged Server Box showing the various components being shipped. These include the overall Server Box, 700, the Windows NT Server Box, 701, the Server Supply Box, 702, the Server Base, 703, the actual PC Server, 704, the Ethernet Hub, 705, and the Ethernet Cables, 706.

Figure 7:
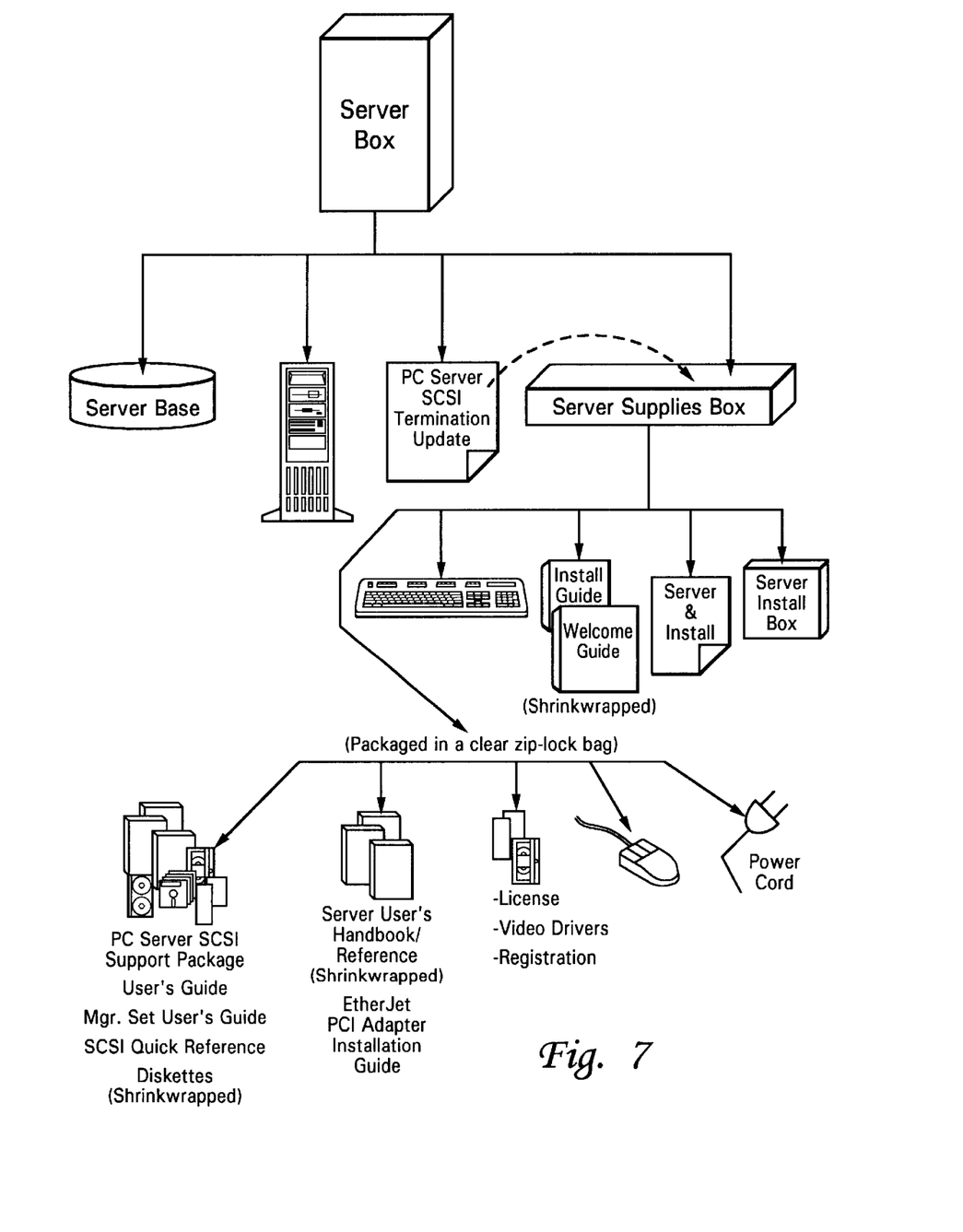
FIG. 7 represents a schematic of the initial set in the assembly. The step calls for opening the Server Box and it reveals the following required materials.

FIG. 7 represents a schematic of the initial set in the assembly. The step calls for opening the Server Box and it reveals the following required materials.

Figure 8:
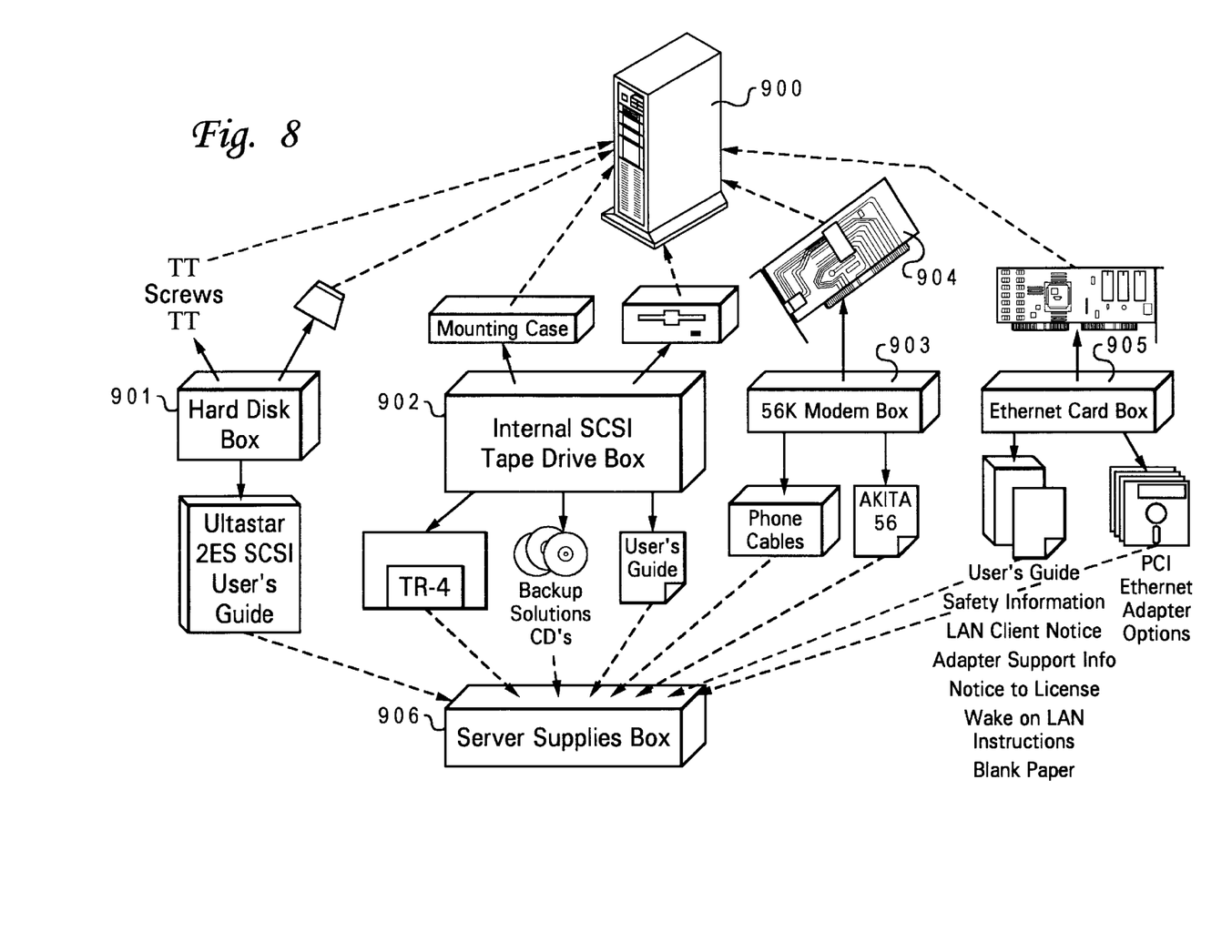
FIG. 8 represents the typical instructions for setting up the Server.

FIG. 8 represents the typical instructions for setting up the Server, 900. The process first calls for installing the Hard Drive, 901, followed by the. installation of the SCSI Tape Drive, 902. This is then followed by the installation of the 56K Internal Modem, 903, which calls for setting Jumper to Com 2, 904. This is then followed by the installation of the Ethernet Card, 904. Then the process calls for placing all Ancillary Materials in Server Supplies Box, 906.

Figure 9:
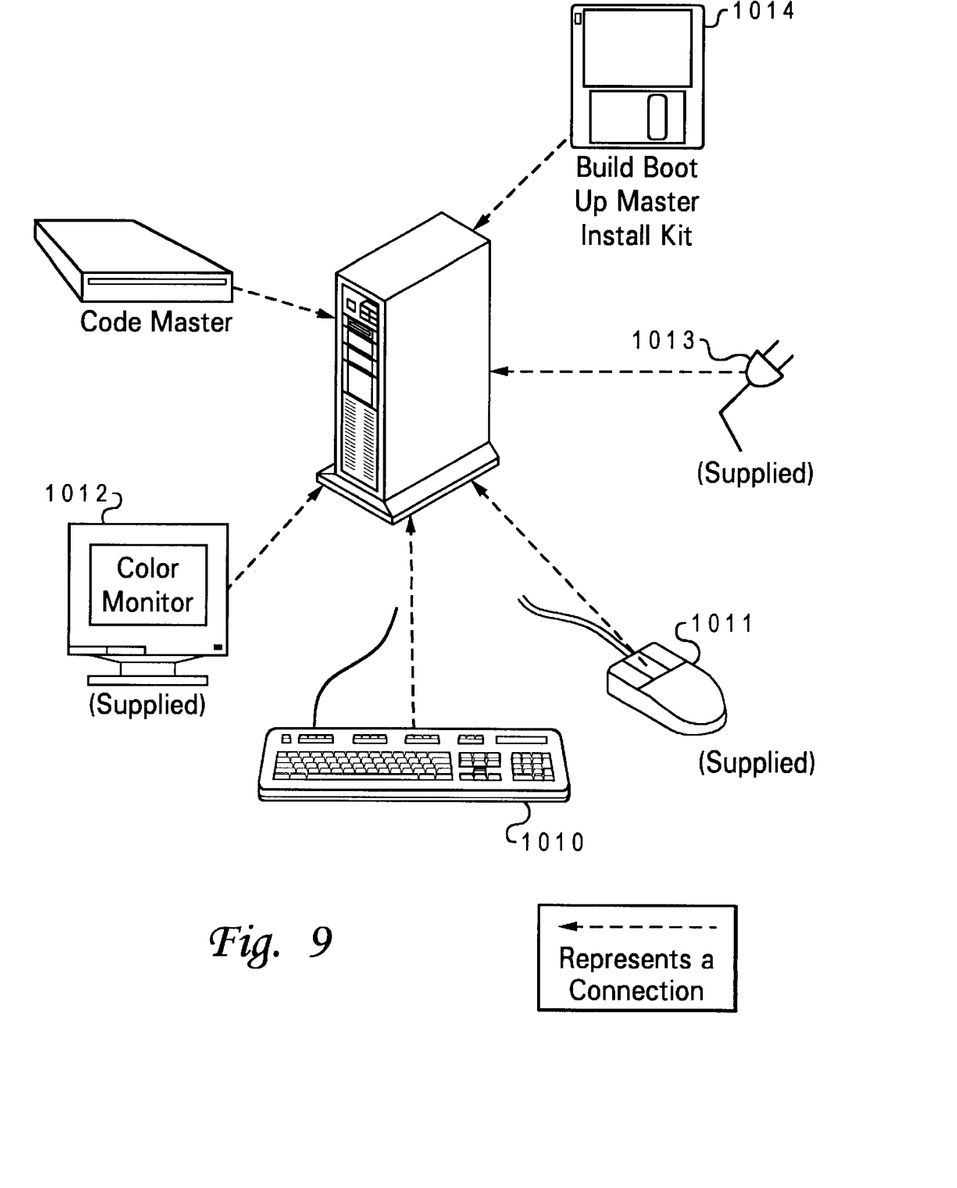
FIG. 9 describes the user process of connecting up the server components.

FIG. 9 describes to the user process of connecting up the server components. The first instructions are to connect Peripherals such as Mouse 1011, Keyboard 1010, and Monitor 1012. Then Server Power to Master Drive at 1013. It then calls for poweron with Boot up Diskette 1014.

Figure 10:
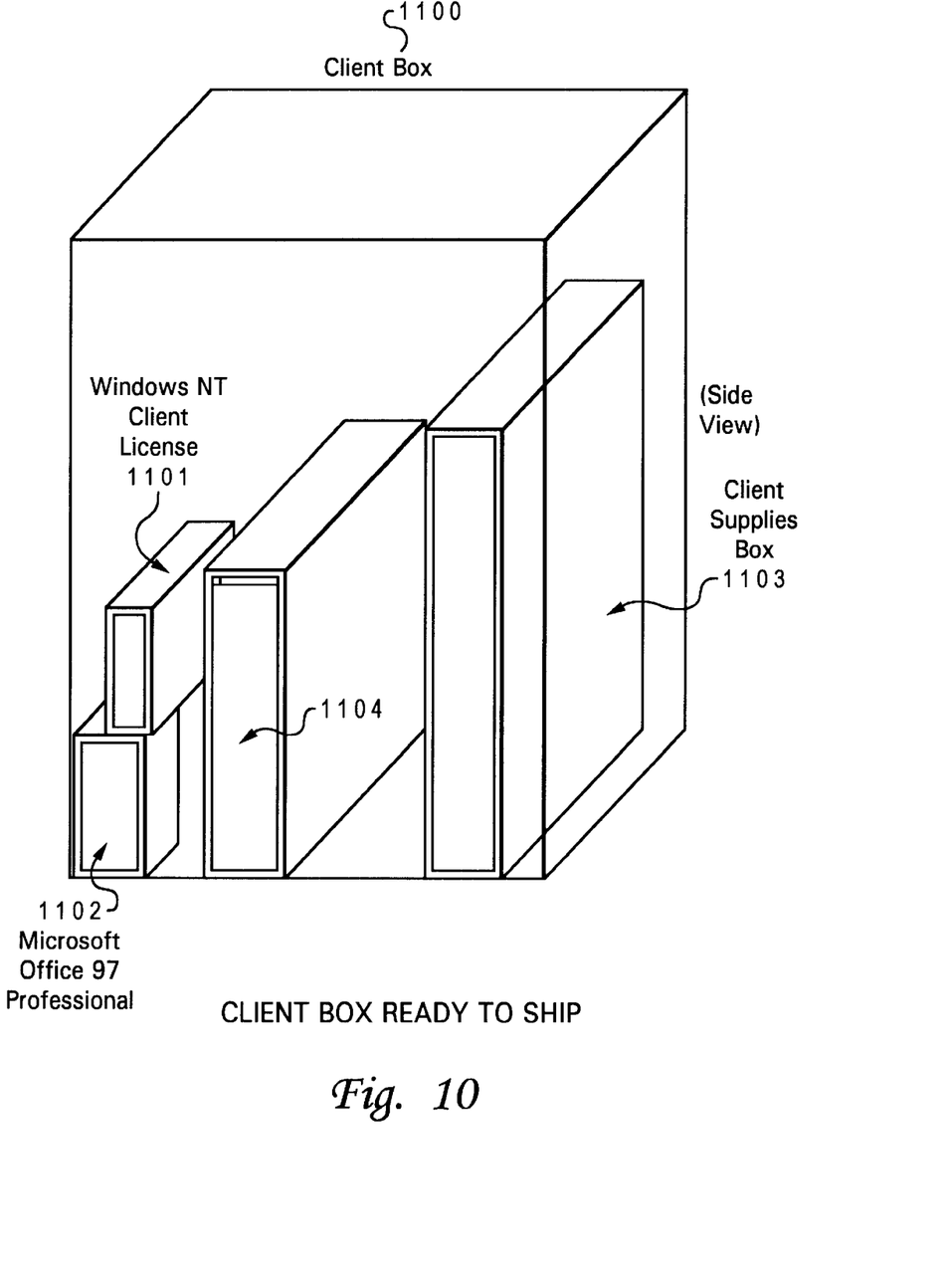
FIG. 10 represents the contents of the packaged Clients Box showing the various components being shipped.

FIG. 10 represents the contents of the packaged Clients Box, 1100, showing the various components being shipped. The contents include Clients Supply Box, 1103, Windows NT, 1101, Microsoft Office 97 package, 1102.

Figure 11:
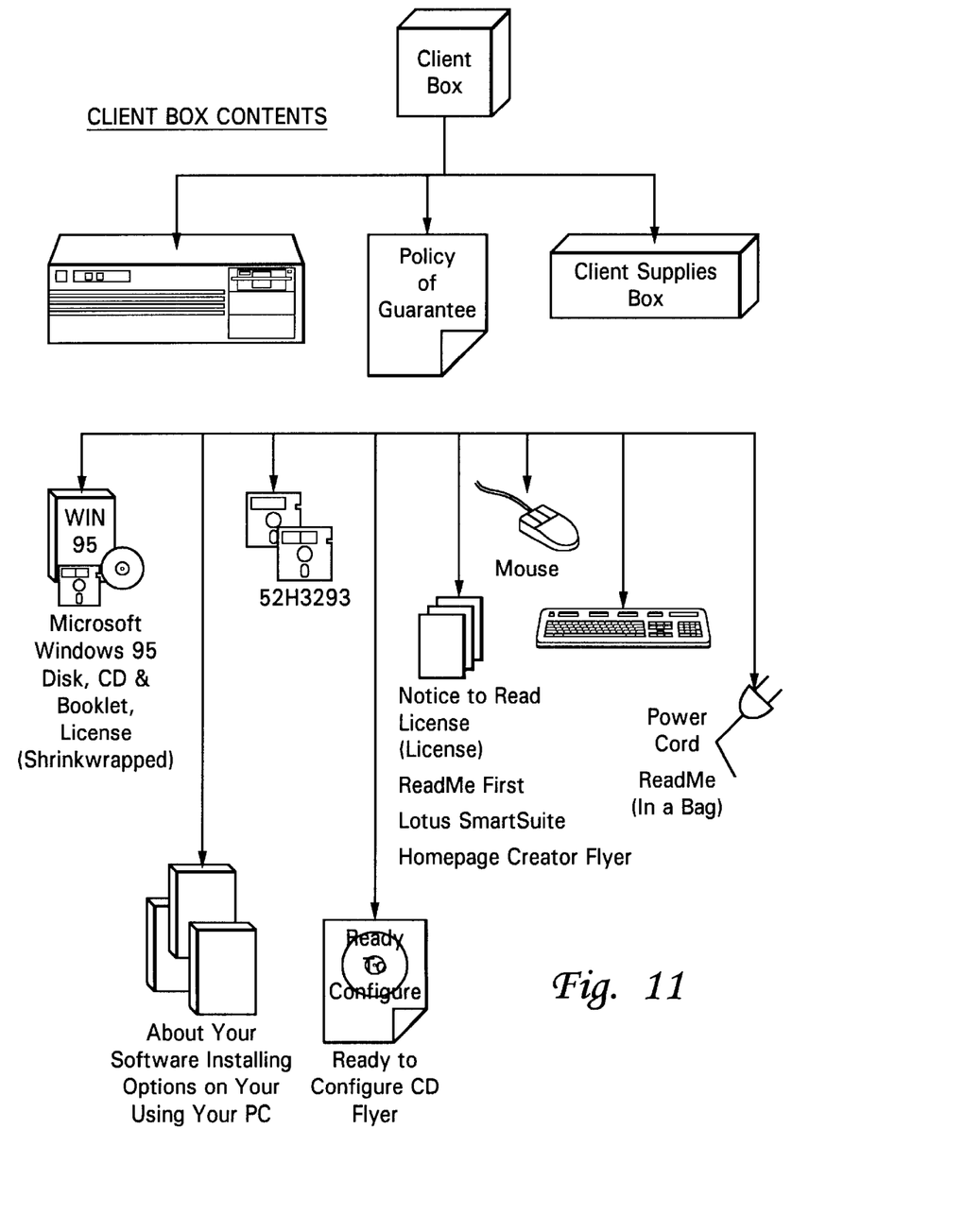
FIG. 11 represents a schematic of the initial setup in the Clients Box.

FIG. 11 represents a schematic of the initial setup in the Clients Box. The step calls for opening the Server Box and reveals the following required materials and content.

Figure 12:
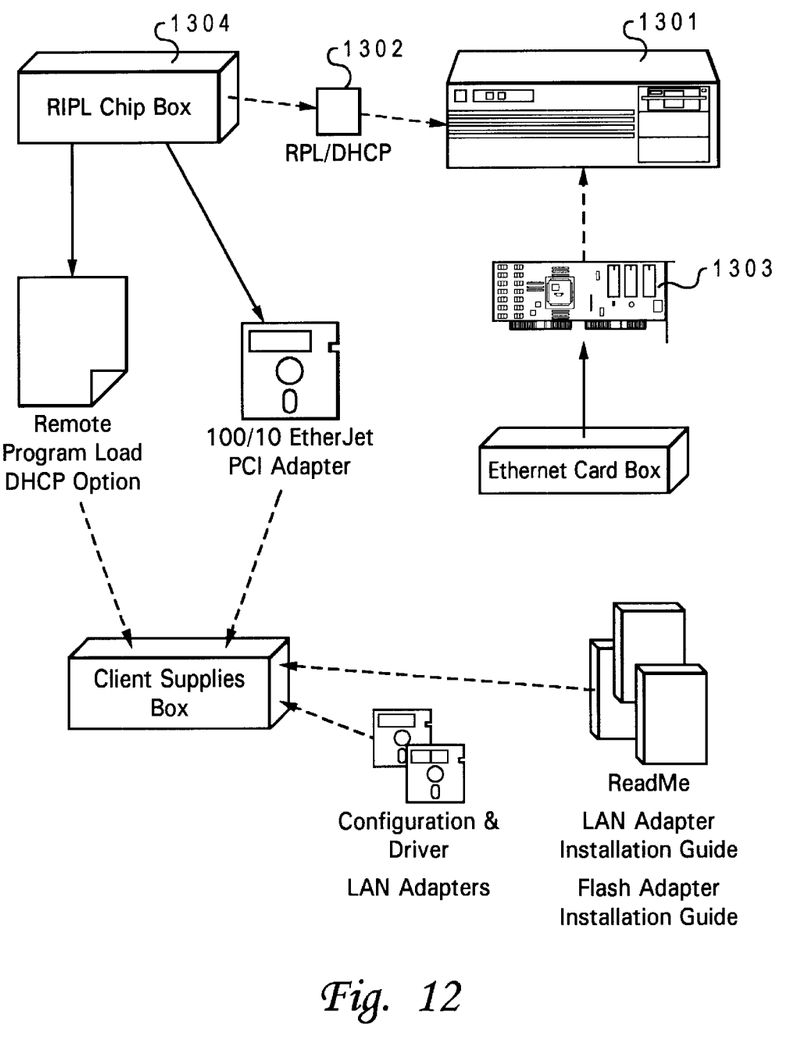
FIG. 12 is the scheme representing the installation of the Ethernet Card.

FIG. 12 represents the installation of the Ethernet Card. The system calls for installing the RIPL chip, 1302, from the RIPL Chip Box, 1304, into the Ethernet Client Card, 1303, and into the client at 1301.

Figure 13:
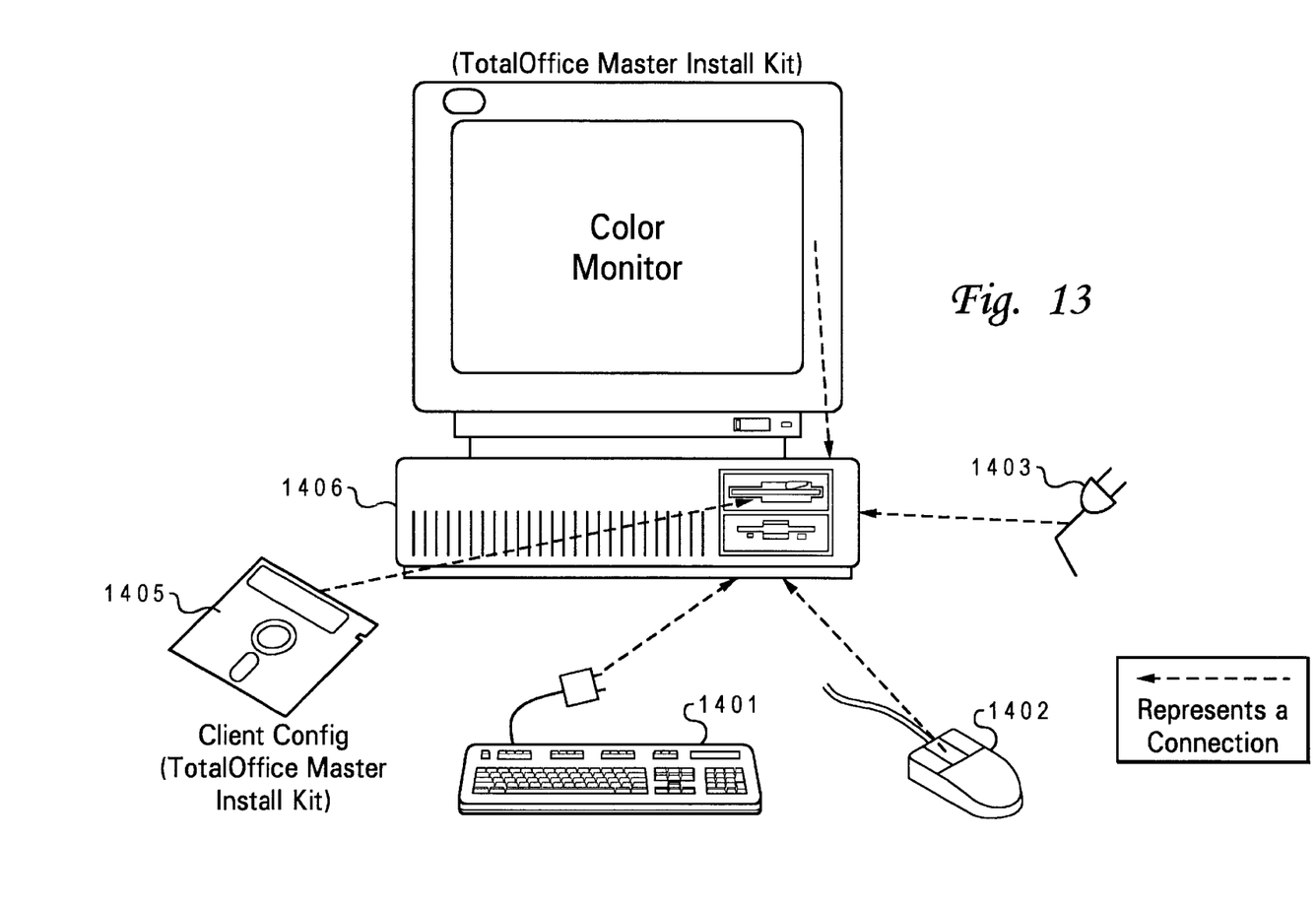
FIG. 13 is the illustration of the configured Client Setup for ease of use.

FIG. 13 is the illustration of the configured Client Setup for ease of use. The correct Peripherals,, Mouse 1402, Keyboard 1401, Power Cable 1403 and Monitor to the Client 1406. The poweron Server with the Client Configuration Disk 1405.

While the invention has been shown and described with reference to particular embodiments thereof, it will be understood by those skilled in the art that the foregoing and other changes in form and detail may be made therein without departing from the spirit and scope of the invention.

What is claimed is:

1. In a computer network environment, having at least one server and at least one client, a system for organizing, building and installing computer network packaging components, including hardware, software, peripherals and services, into a kit; said system comprising:

means for providing the user with instructions on that which is supplied in the kit and how to specifically plan the use of said kit components to build said network;

means for instructing said user on the order of assembly of said components in said kit and where to place unused parts and how to use said network system;

means for telling user where exactly to place all items provided in said kit;

means for instructing the user regarding the required steps to take in order to use each package of said kit; and means for incorporating a Reseller's licensed software package into said kit in order to complete the kit, prior to being supplied to user.

2. The system of claim 1 whereby the inexperienced computer user can expeditiously assemble said kit components and build said network computing environment in as short a period of time as 30 minutes to 5 hours.

3. The system of claim 2 whereby the inexperienced computer user can expeditiously assemble said kit components and build a network computing environment in as short a period of time as 1 to 2 hours.

4. The system of claim 1 whereby said computer network installation kit also includes labels for Resellers to use to mark said network components as documented in said kit, for use and reference while using said kit.

5. The system of claim 1 whereby upon completion of said network installation, said kit can subsequently be used again in the future if needed to establish another network computing environment.

6. In a computer network environment having at least one server and at least one client, a method for organizing, building and installing computer network packaging components, including hardware, software, peripherals, and services into a kit, said method comprising the steps of:

providing user with instructions on what is supplied in said kit and how to plan the use of said kit components to build the network;

instructing user on the order of assembly of said kit components and where to place unused parts and how to use the network system;

informing user as to where to place all items provided in said kit;

designating the required steps for said user to take in using each package that comprises said network environment; and incorporating Resellers licensed software package into said kit in order to complete the kit, prior to being supplied to user.

7. The method of claim 6 whereby the inexperienced computer user or small business owner can expeditiously assemble said kit components and build a network, computing environment in as short a period of time as 30 minutes to 5 hours.

8. The method of claim 7 whereby the inexperienced computer user or small business owner can expeditiously assemble said kit components and build said network computing environment in as short a period of time as 1 to 2 hours.

9. The method of claim 6 whereby said computer network installation kit also includes labels for Resellers to use to mark said network components as documented in said kit for use and reference while using said kit.

10. The method of claim 6 whereby upon completion of said network installation said kit can subsequently be used again in the future if needed to establish another network computing environment.

11. In a computer network environment having at least one server and at least one client, a computer readable program having data structures included on a computer readable medium for organizing, building and installing computer network packaging components, including hardware, software, peripherals and services, into a kit; said computer readable program comprising:

means for providing the user with instructions on that which is supplied in said kit and how to specifically plan the use of said kit components to build said network;

means for instructing said user on the order of assembly of said components in said kit and where to place said unused parts and how to use network system;

means for telling user where exactly to place all items provided in said kit;

means of instructing the end user regarding the required steps to take in order to use each package that comprises the system; and means for incorporating Reseller's licensed software package into said kit in order to complete the kit, prior to being supplied to user.

12. The computer readable program of claim 11 whereby the inexperienced computer user or small business owner can expeditiously assemble said kit components and build a network computing environment in as short a period of time as 30 minutes to 5 hours.

13. The computer readable program of claim 12 whereby said inexperienced computer user or small business owner can expeditiously assemble said kit components and build a network computing environment in as short a period of time as 1 to 2 hours.

14. The computer readable program of claim 11 whereby said computer network installation kit also includes labels for Resellers to use to mark said network components as documented in said kit for use and reference while using said kit.

15. The computer readable program of claim 11 whereby upon completion of said network installation, said kit can subsequently be used again in the future if needed to establish another network computing environment.

16. In a computer network environment having at least one server and at least one client, the use of a method for organizing, building and installing computer network packaging components, including hardware, software, peripherals and services, into a kit; said method comprising the steps of:

providing user with instructions on what is supplied in said kit and how to plan the use of said kit components to build the network;

instructing user on the order of assembly of said kit components and where to place unused parts and how to use the network system;

informing user as to where to place all items provided in said kit;

designating the required steps for said user is to take in using each package that comprises said network environment; and incorporating Reseller's licensed software package into said kit in order to complete the kit, prior to being supplied to user.

17. The use of the method of claim 16 whereby the inexperienced computer user or small business owner can expeditiously assemble said kit components and build a network computing environment in as short a period of time as 30 minutes to 5 hours.

18. The use of the method of claim 17 whereby the inexperienced computer user or small business owner can expeditiously assemble said kit components and build a network computing environment in as short a period of time as 1 to 2 hours.

19. The use of the method of claim 16 whereby said computer network installation kit also includes labels for Resellers to use to mark said network components as documented in said kit for use and reference while using said kit.

20. The use of the method of claim 16 whereby upon completion of said network installation said kit can subsequently be used again in the future if needed to establish another network computing environment.

21. In a computer network environment having at least one server and at least one client, a system for organizing, building and installing computer network packaging components, including hardware, software, peripherals and services, into a kit; said system comprising:

mechanism for providing the user with instructions on that which is supplied in the kit and how to specifically plan the use of said kit components to build said network;

mechanism for instructing said user on the order of assembly of said components in said kit and where to place unused parts and how to use said network system;

mechanism for telling user where exactly to place all items provided in said kit;

mechanism for instructing the user regarding the required steps to take in order to use each package of said kit; and mechanism for incorporating a Reseller's licensed software package into said kit in order to complete the kit, prior to being supplied to user.

* * * * *